Jan. 8, 1952
R. T. COLLIER
2,581,752
METHOD FOR MAKING AMMONIUM SULFITE
Filed Aug. 4, 1947
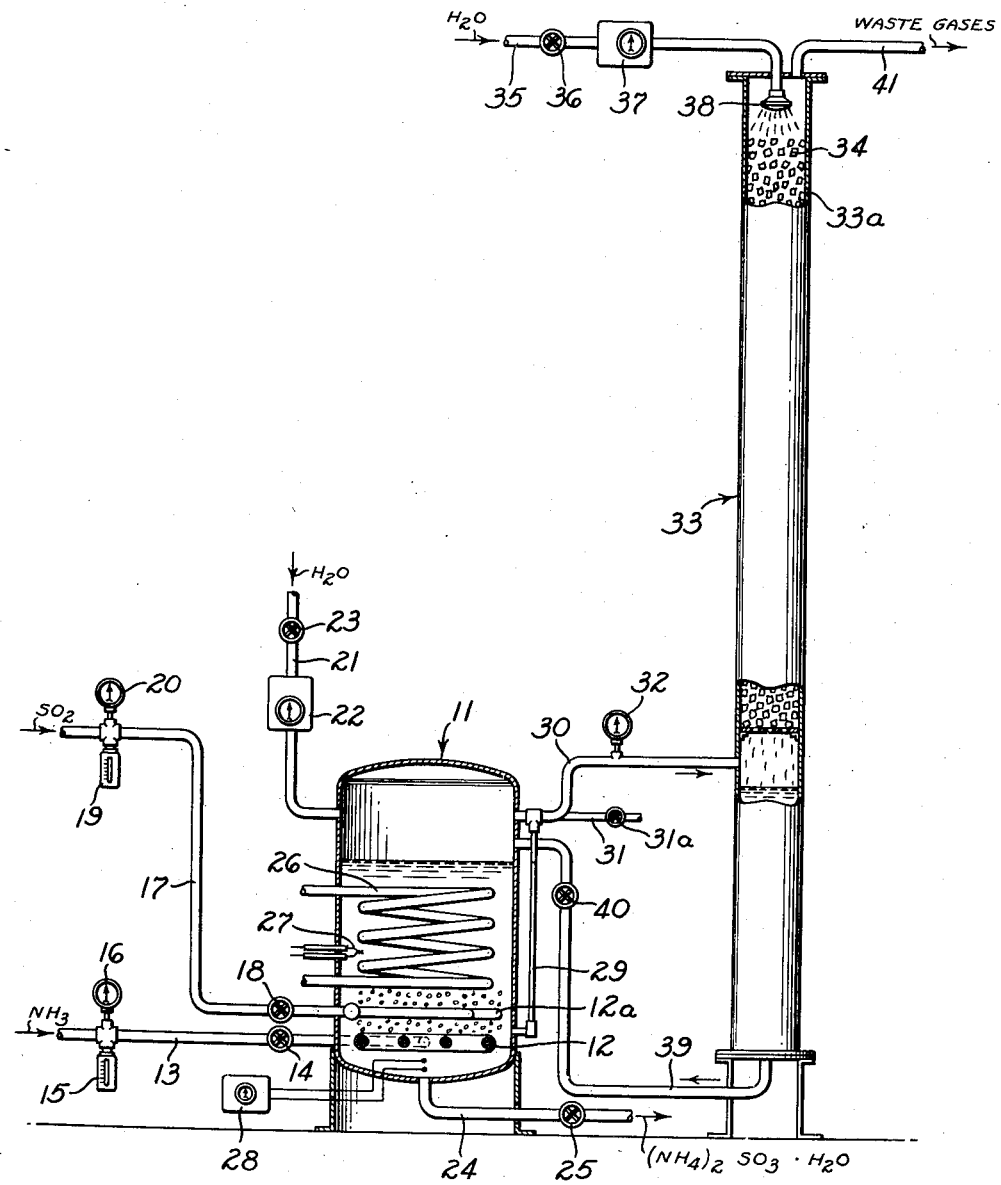
INVENTOR.
ROBERT T. COLLIER
BY HIS ATTORNEYS.
HARRIS, KIECH, FOSTER & HARRIS

UNITED STATES PATENT OFFICE 2,581,752

METHOD FOR MAKING AMMONIUM SULFITE

Robert T. Collier, Palos Verdes Estates, Calif., assignor to R. T. Collier Corporation, Los Angeles, Calif., a corporation of California Application August 4, 1947, Serial No. 765,836

7 Claims. (Cl. 23—129)

This invention relates to a method and apparatus for the production of ammonium sulfite, either in crystalline form or in solutions of various concentrations, by the direct reaction in aqueous solution of ammonia and sulfur dioxide gases, and is of particular utility in connection with the production of ammonium sulfite for use as a fertilizer.

In the production of a fertilizer such as ammonium sulfite, it is desirable to employ a process which may be carried out economically in a small plant capable of limited production for local use. By locating small units at or near the centers of such use, the sale of ammonium sulfite in liquid form for simple addition to irrigation water becomes economically feasible. It is an object of my invention to provide a method and apparatus for the production of ammonium sulfite which is especially adapted for small plant operation, and which is capable of low cost installation and simple control.

It is a further object of my invention to provide a method and apparatus for the production of ammonium sulfite in any desired physical state varying from dilute or saturated solutions to the crystalline salt, in the form of an aqueous slurry, and simple means to vary and control the physical state of the reaction product during the operation of the process.

It is of paramount importance in the formation of ammonium sulfite by the direct reaction of ammonia and sulfur dioxide gases in solution that the pH conditions locally at the zone of reaction between the ammonia and sulfur dioxide, as well as in the end-product solution, be carefully and differentially regulated. I have found that at the zone in which the sulfur dioxide enters the aqueous medium an excess of ammonia should be present, and the solution should be highly basic in order to prevent the escape and loss of sulfur dioxide from the system. Moreover, I have found that if the reaction takes place in a zone of low pH, i. e., lower than 6, formation of ammonium bisulfite, as well as other undesirable products, occurs, and the process therefore operates with diminishing effectiveness. To prevent the formation of ammonium bisulfite and other by-products, I introduce the ammonia gas into the reaction chamber below the sulfur dioxide gas. The sulfur dioxide is thus bubbled into a solution which already contains a heavy concentration of ammonia at the point of discharge of the sulfur dioxide into the solution, and the basic nature of the solution at this point reduces the formation of these undesired compounds to a minimum.

I have found, on the other hand, that if the pH of the end-product solution is too high, for example substantially greater than 7.5, the system loses efficiency due to the escape of unreacted ammonia gas. In addition, such a basic solution is less capable of holding ammonium sulfite in solution, thus limiting the possible liquid phase concentration.

Maximum concentrations of ammonium sulfite may be maintained in solution if the solution is neither excessively acid nor basic. It is an object of my invention therefore to provide a process and apparatus wherein the pH of the solution at the local zone of reaction is basic, while that of the end-product may be easily controlled within limits close to a pH of 7, such as a range of, for example, from 6 to 7.5.

As previously indicated, in order to provide a basic medium at the zone of the reaction with the sulfur dioxide, the ammonia is introduced in my apparatus at a point below the introduction of the sulfur dioxide, whereby the liquid first absorbs ammonia, making it highly basic, before passing into contact with the sulfur dioxide entering at a higher level in the liquid. In addition, the pH of the reaction product is controlled in my apparatus merely by regulating the flow of the gases into the solution; that is, by decreasing the flow of sulfur dioxide when the pH of the end-product becomes too low, and conversely by decreasing the rate of flow of ammonia gas when the pH becomes too high.

By maintaining the pH of the reaction product within definite limits, in addition to obtaining the advantages listed above, I avoid the necessity of using corrosion-resistant materials for the reaction vessels of my apparatus, and I obtain a product which is not corrosive to handling and storage vessels and can be transported to the point of use in ordinary water tank carriers.

In order that ammonium sulfite may be produced at a cost which makes it economically feasible for use as a fertilizer, an inexpensive source of the reaction component, sulfur dioxide, must be employed in the process. As a waste product in many commercial processes, sulfur dioxide is available at very low cost in a dilute form mixed with other waste gases. It is an object of my invention to provide a method and apparatus for producing ammonium sulfite which will operate directly with a dilute source of sulfur dioxide, and which is capable of being so regulated that lack of uniformity in the concentration of the sulfur dioxide source will not impair the operation or continuous nature of the process.

Since the vapor pressures of both ammonia and sulfur dioxide in solution increase with a rise in temperature, and the ammonium sulfite forming reaction is exothermic in nature, it is necessary to control the solution temperature during the reaction in order to retain the gases in solution long enough for the reaction to take place. I have found that at temperatures substantially above 150° F. gas losses increase rapidly with any increase in temperature. Best results were obtained at 100° F., and lower temperatures were found to require excessive cooling effort. However, for the production of crystalline ammonium sulfite I have found that temperatures in the neighborhood of 150° F. are most suitable, the crystals settling out of solution when the temperature is subsequently lowered.

It is a further object of my invention, therefore, to provide a process and apparatus wherein cooling means are available for controlling and easily regulating the temperature of the solution in which the reaction takes place.

It is a further object of my invention to provide a method and apparatus whereby any unreacted component gases leaving the reaction chamber may be captured and returned to the system.

It is a further object of my invention to provide a method and apparatus which is continuous in function such that the reacting gases may be fed thereto and the reaction product removed continuously during the operation of the process.

Other objects and advantages of my invention will become apparent from the following specification and the drawing, which is for illustrative purposes only.

Referring to the drawing, I show an apparatus consisting of a reaction chamber 11, preferably disposed vertically, into which, at its lower portion, gases are introduced through gas dispersion tubes 12 and 12a. These tubes are made of a porous inert material designed to discharge the gases into the liquid within the reaction chamber in the form of a large number of extremely fine bubbles. Any arrangement of such discharge tubes which will accomplish a more or less uniform distribution of such gas bubbles throughout the reaction chamber is suitable. I have shown each set of the gas dispersion tubes arranged as a number of horizontally disposed parallel tubes, those discharging sulfur dioxide gas being arranged in a plane just above and running perpendicularly to those discharging the ammonia. Tubes arranged in concentric rings may, however, be employed with equal effectiveness for this purpose.

Ammonia gas is introduced into the reaction chamber 11 through a pipe 13 into the lower gas discharge tubes 12, the pipe 13 having a valve 14, thermometer 15, and pressure gauge 16 connected therewith. Similarly, sulfur dioxide gas is introduced through a pipe 17 into the upper gas discharge tubes 12a, the pipe 17 having a valve 18, thermometer 19, and pressure gauge 20 connected therewith.

Water is supplied to the reaction chamber 11 at its upper end through a pipe 21 having a flow meter 22 and a valve 23. The reaction product is withdrawn from the base of the reaction chamber 11 through a tube 24 having a valve 25.

Located within the reaction chamber 11 above the upper gas discharge tubes 12a are a spiral water tube cooler 26 and a thermometer 27. At or near the base of the reaction chamber 11, the pH of the reaction product is determined by means of a pH meter 28. A liquid level indicator 29 is preferably also provided.

Opening into the upper portion of the reaction chamber 11 is a pipe 30 communicating with a scrubber column 33. A gas sampling tube 31, having a valve 31a, branches off from the pipe 30. The scrubber column 33 has a shell 33a and is packed in its upper portion with an inert packing material 34, such as porcelain Raschig rings or beryl saddles. Water enters the scrubber column 33 by means of a pipe 35 having a valve 36 and a flow gauge 37, and is discharged through a sprinkler head 38 at the top of said column. Accumulated liquid in the lower portion of said column is recycled to the upper portion of the reaction chamber 11 through a pipe 39 having a valve 40. Unreacted gas is discharged from the top of the scrubber column 33 through a pipe 41.

I have shown the scrubber column 33 as a separate unit from the reaction chamber 11; however, in variable form, the column may be disposed above the reaction chamber, the bottom of said column opening directly into the top of the reaction chamber and forming a part thereof. Such a combination would show the scrubber column as a mere extension of the reaction chamber at its upper end somewhat smaller in cross-sectional area than the main body of the reaction chamber.

In operation, the reaction chamber 11 is preferably maintained approximately two-thirds filled with aqueous solution, as indicated by the liquid level indicator 29. Ammonia gas is admitted to the reaction chamber by opening the valve 14, being discharged into the chamber as a large number of small bubbles through the lower gas discharge tubes 12. The temperature and pressure of the incoming ammonia gas are observed from the thermometer 15 and pressure gauge 16, respectively. Similarly, sulfur dioxide is admitted into the reaction chamber through the upper gas discharge tubes 12a. The temperature and pressure of the incoming sulfur dioxide gas are observed from the thermometer 19 and pressure gauge 20, respectively. It is important to adjust the rate of flow of the two gases into the chamber with respect to each other in such a manner that the pH of the reaction product, as observed on the pH meter, remains as close to 7 as possible and definitely within the range of from 6 to 7.5. This is accomplished by throttling the valve 14 and decreasing the rate of discharge of ammonia into the reaction chamber if the solution in the chamber becomes too basic, as indicated on the pH meter 28, or, conversely, by throttling the valve 18 and decreasing the rate of flow of surfur dioxide if the solution becomes too acidic. Also, of course, either of the valves 14 or 18 may be opened wider to accomplish a similar control.

Water is constantly supplied to the reaction chamber 11 through the pipe 21 by opening the valve 23, the rate of flow being observed by the meter 22. Water is also supplied to the scrubber column through the pipe 35 by similar regulation of the valve 36, the rate of flow being observed from the meter 37. This water passes through the sprinkler head 38, where it is discharged as a spray above the packing 34, and thence seeps down through the packing material 34 of the scrubber column 33. Excess ammonia and sulfur dioxide gases which have not reacted in the reaction chamber 11 flow through the pipe 30 into the chamber below the packing 34 and thence up through the packing 34 of the scrubber column 33, where they are absorbed in whole or in part by the downwardly seeping aqueous solution. When the liquid level of this solution in the lower portion of the scrubber column 33 rises above the level of the entrance of the pipe 39 into the reaction chamber 11, the liquid will commence to flow by gravitational action from the scrubber column 33 into the reaction chamber 11 through the pipe 39.

The reaction product may be continuously withdrawn from the base of the reaction chamber 11 through the pipe 24, the rate of withdrawal being regulated by the valve 25. The concentration of the ammonium sulfite product in solution for any set rate of gas flow is determined by the rate of withdrawal of the reaction product, a greater rate of withdrawal yielding a more dilute solution, and, within limits of saturation, a slower withdrawal rate yielding a more concentrated solution. Such rate of withdrawal of the reaction product will determine in addition the rate of addition of water through the pipes 21 and 35, since water is preferably supplied in such a manner as to maintain the liquid level substantially constant.

The rate of injection of gas into the reaction chamber will usually be as rapid as possible consistent with the substantially complete absorption of the reacting gases within the reaction chamber and the minimum of escape thereof to the scrubber. Once this rate has been established, the foregoing considerations will influence the concentration of ammonium sulfite in the end-product.

The temperature of the solution in the reaction chamber 11, as observed by means of the thermometer 27, is regulated by means of the cooling coil 26 to approximately 100° to 130° F. by passing a cooling fluid through the coil. However, if the product is desired in the solid crystalline state, the temperature of the solution in the reaction chamber 11 may be allowed to rise to 150° F. and the solution cooled during withdrawal from the reaction chamber. On cooling, the crystalline product will settle out of solution and may be separated from the remaining solution, which is then either used as such or recharged into the system.

If pure ammonia and sulfur dioxide gases are used as a material source, regulation of the pH of the product solution within the prescribed limits will accomplish the absorption of all or practically all of these gases in the reaction chamber, provided the product is withdrawn at a sufficient rate, with respect to the rate of gas flow, to prevent oversaturation. Substantially pure $SO_2$ may be economically obtained, for example, by the absorption in a cool water scrubber of the $SO_2$ component of oil refinery flue gases and the subsequent driving off of the $SO_2$, for admission to the ammonium sulfite manufacturing plant, by the application of heat to the sulfurous acid solution. However, it may be more feasible to use dilute sulfur dioxide from a waste source mixed with other gases or obtained by burning raw sulfur. If dilute sulfur dioxide obtained, for example, from the burning of raw sulfur is employed, inert components in the gas stream will bubble through the solution without absorption and eventually be discharged through the outlet pipe 41 at the top of the scrubber column 33. I have used a dilute 15% sulfur dioxide gas stream in obtaining a product of 35% concentration of ammonium sulfite, which is a concentration well suited for use as a fertilizer by addition to irrigation water. The essentials on such a run are indicated as follows:

Rate of gas flow

| | Pounds per hour |
|---|---|
| Ammonia | 10 |
| Sulfur dioxide (as 15% gas stream) | 18.7 |

Rate of water flow

| | Pounds per hour |
|---|---|
| To reaction chamber | 15 |
| To scrubbing tower | 38 |

Rate of withdrawal

| | Pounds per hour |
|---|---|
| 35% solution | 81.7 |

Temperature

| | Degrees Fahrenheit |
|---|---|
| Reaction zone | 130 |

Tail gas

From reaction chamber neutral except for occasional fluctuations due to poor gas atomization (0.1% $NH_3$—0.1% $SO_2$)
From scrubbing column—neutral

Final tail gas pressure

| | Pounds per square inch |
|---|---|
| At top of scrubber column | 5 |

It will be observed in the illustrative run that a pressure of five pounds per square inch was built up in the apparatus at the rates of flow set forth and in the presence of the non-reactive gases introduced with the sulfur dioxide. It will be understood, however, that the process can be carried out at substantially atmospheric pressures, or, if desired, the operation may be conducted at pressures substantially above atmospheric, which permits accelerated absorption of reaction of the gases and building up of concentrations without increase of temperature.

While I have shown and described a preferred embodiment of my invention and certain variations thereof, I do not desire to be limited by such specific description, but desire to be afforded the full scope of the following claims.

I claim as my invention:

1. A method of producing ammonium sulfite, including the steps of: continuously introducing ammonia into a body of water at a level below the top surface thereof for upward dispersion to create an alkaline zone in the body of water; continuously introducing sulfur dioxide into said body of water above said level in said zone to react with the dispersed ammonia to form ammonium sulfite; continually adding water to said body; and continually drawing water from said body containing the ammonium sulfite in solution.

2. A method of producing ammonium sulfite as set forth in claim 1 in which the rates of introduction of the ammonia and the sulfur dioxide are regulated to maintain the pH of the drawn off solution substantially neutral.

3. A method of producing ammonium sulfite as set forth in claim 1 in which the rates of introduction of the ammonia and the sulfur dioxide are regulated to maintain the pH of the drawn off solution between 6 and 7.5.

4. A method of producing ammonium sulfite as set forth in claim 1 in which the water is added above the level of introduction of the sulfur dioxide and the water containing the ammonium sulfite in solution is drawn off below said level of ammonia introduction to create downward flow through said zone.

5. A method of producing ammonium sulfite as set forth in claim 4 in which the rates of introduction of the ammonia and the sulfur dioxide are regulated to maintain the pH of the drawn off solution between 6 and 7.5.

6. A method of producing ammonium sulfite as set forth in claim 5 in which the heat of reaction in said zone is controlled with an upward limit on the order of 150° F.

7. A method of producing ammonium sulfite as set forth in claim 5 which includes the steps of continually drawing off heat from said zone by heat exchange to maintain the temperature in the zone between 100° F. and 130° F.

ROBERT T. COLLIER.

REFERENCES CITED

The following references are of record in the file of this patent:

UNITED STATES PATENTS

| Number | Name | Date |
| --- | --- | --- |
| 2,004,799 | Richardson | June 11, 1935 |